US012765722B2

(12) United States Patent
Hellmers et al.

(10) Patent No.: US 12,765,722 B2
(45) Date of Patent: Oct. 20, 2026

(54) TOASTER WITH BREAD LIFT MECHANISM

(71) Applicant: Breville Pty Limited, Alexandria (AU)

(72) Inventors: Duncan Bruce Hellmers, Alexandria (AU); Johnson Thie, Alexandria (AU); Stephen John McClean, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 285 days.

(21) Appl. No.: 18/689,917

(22) PCT Filed: Sep. 16, 2022

(86) PCT No.: PCT/AU2022/051118
§ 371 (c)(1),
(2) Date: Mar. 7, 2024

(87) PCT Pub. No.: WO2023/039636
PCT Pub. Date: Mar. 23, 2023

(65) Prior Publication Data

US 2024/0382040 A1 Nov. 21, 2024

(30) Foreign Application Priority Data

Sep. 16, 2021 (AU) ................................ 2021902985

(51) Int. Cl.
*A47J 37/08* (2006.01)
*H05B 3/26* (2006.01)

(52) U.S. Cl.
CPC ....... *A47J 37/0814* (2013.01); *A47J 37/0871* (2013.01); *H05B 3/265* (2013.01); *H05B 2203/003* (2013.01)

(58) Field of Classification Search
CPC .... A47J 37/0814; A47J 37/0871; A47J 37/08; A47J 37/0807; A47J 37/0857;
(Continued)

(56) References Cited

U.S. PATENT DOCUMENTS 2,301,070 A 11/1942 Meyers
2,590,334 A * 3/1952 Loomer ............. A47J 37/0814 99/335

(Continued)

OTHER PUBLICATIONS

International Search Report and Written Opinion dated Nov. 22, 2022 in corresponding PCT/AU2022/051118 (11 pages).

(Continued)

*Primary Examiner* — Tiffany T Tran
(74) *Attorney, Agent, or Firm* — KDW FIRM PLLC

(57) ABSTRACT

There is disclosed herein a toaster (2) for toasting bread or other food, the toaster (2) comprising: a body (4) having an upward facing slot (6) to receive a slice of bread or a food to be toasted; a carriage (16) mounted in the body beneath the slot (6) to receive a slice of bread, the carriage (16) being movable between an elevated position and a lowered position; a heating panel (10) mounted to the body (4) in an upright configuration adjacent the carriage (16) for toasting one side of a slice of bread in the carriage (16); a linkage assembly (53) for connecting the heating panel (10) to the carriage (16); wherein, the heating panel (10) has a contracted form when not toasting bread, and an expanded form when toasting bread, the heating panel (10) having a vertical dimension in the contracted form that is less than the vertical dimension in the expanded form, and the linkage assembly (53) is configured to move the carriage (16) from the elevated position to the lowered position when the heating panel (10) moves from the contracted form to the expanded form.

19 Claims, 16 Drawing Sheets

(58) Field of Classification Search
CPC .............. H05B 3/265; H05B 2203/003; H05B 2203/014; H05B 3/16
See application file for complete search history.

(56) References Cited

U.S. PATENT DOCUMENTS

| | | | | | |
|---|---|---|---|---|---|
| 2,667,828 | A | | 2/1954 | Koci | |
| 2,818,011 | A | | 12/1957 | Flemming et al. | |
| 2,861,513 | A | | 11/1958 | Weeks | |
| 3,350,997 | A | * | 11/1967 | Shinzo | A47J 37/0814 219/510 |
| 3,461,274 | A | | 8/1969 | Williams | |
| 5,528,980 | A | * | 6/1996 | McClean | A47J 37/0871 99/385 |
| 5,802,957 | A | | 9/1998 | Wanat et al. | |
| 8,336,449 | B2 | | 12/2012 | Brady | |
| 2016/0338538 | A1 | | 11/2016 | Palmeto et al. | |
| 2020/0260912 | A1 | * | 8/2020 | Carbone | A47J 37/0871 |

OTHER PUBLICATIONS

European Search Report for EP Application No. 22868470.0, dated Jun. 25, 2025, 10 pages.

* cited by examiner

TOASTER WITH BREAD LIFT MECHANISM

CROSS-REFERENCE TO RELATED APPLICATIONS

This application is a national phase application of PCT International Patent Application No. PCT/AU2022/051118, filed Sep. 16, 2022, which claims the benefit of Australia Patent Application Serial No. 2021902985 filed Sep. 16, 2021, the disclosures of which are incorporated herein by reference in their entireties.

FIELD

The invention relates to toasters that have automatic lifting and lowering mechanisms for the bread.

BACKGROUND

While toasters are sometimes used to toast pastries, muffins and other foods they predominately toast slices of bread and the invention will be described with reference to this primary use. However, terms such as "bread carriage" are not to be construed as restricting the toaster to use with bread as toasters are equally suitable for a range of other food products.

The majority of modern toasters have two or more upwardly facing slots for receiving slices of bread. These slots lead to respective bread carriages within the body of the toaster. The bread carriages are in an elevated position when the slice is placed through the slot so that a significant portion of the bread is left protruding from the toaster body. To toast the bread, the carriage is moved from the elevated position to a lowered position for simultaneously toasting both sides of the slice.

Traditionally the carriage is moved manually by the user to the lowered position. More sophisticated toasters have a mechanism to actively move the carriage between the elevated position and the lowered position and vice versa (see, for example U.S. Pat. No. 8,336,449 B2). This mechanism may use a motor to elevate and lower the carriage, but the addition of these components requires careful consideration to shield them from the heaters during the toasting operation. Other toasters have used horizontal expansion and contraction of the heating elements to assist the movement of the bread carriage (see, for example U.S. Pat. No. 2,590,334 and AU 4170878). Converting the horizontal expansion of heater elements to a vertical movement requires a complex mechanism. The complexity of the mechanism inherently increases the mechanical losses and the efficiencies in converting horizontal expansion to vertical lifting forces acting on the bread carriage. Furthermore, the horizontal heating wires for toasting the bread need flexible tensioning mechanisms to keep them flat against a supporting panel of thermally insulating heat shields (typically made of mica). Without tensioning the heating wires, they can bow outwards as they thermally expand which can lead to contact between adjacent wires resulting in a short circuit.

SUMMARY

With the above issues in mind, one aspect of the present invention provides a toaster for toasting bread or other food, the toaster comprising:

a body having an upward facing slot to receive a slice of bread or a food to be toasted;

a carriage mounted in the body beneath the slot to receive a slice of bread, the carriage being movable between an elevated position and a lowered position;

a heating panel mounted to the body in an upright configuration adjacent the carriage for toasting one side of a slice of bread in the carriage;

a linkage assembly for connecting the heating panel to the carriage; wherein, the heating panel has a contracted form when not toasting bread, and an expanded form when toasting bread, the heating panel having a vertical dimension in the contracted form that is less than the vertical dimension in the expanded form, and the linkage assembly is configured to move the carriage from the elevated position to the lowered position when the heating panel moves from the contracted form to the expanded form.

Preferably, the heating panel has an electrical conductor defining a series of generally vertical conductive paths spaced across the heating panel such that resistive heating of the electrical conductor causes thermal expansion to move the heating panel to the expanded form.

Preferably, the heating panel has a thermal insulation card and the electrical conductor is a heating wire supported on the card in a serpentine configuration such that the generally vertical conductive paths are spaced across one side of the card facing the carriage.

Preferably, the heating panel has a bottom bracket connected to the linkage assembly, and the heating panel is mounted within the body such that the bottom bracket moves downward in response to the thermal extension to the expanded form.

Preferably, the thermal insulation card has an upper portion and a lower portion, the lower portion being configured to move downward relative to the upper portion in response to the thermal expansion.

Preferably, the thermal insulation card is formed from mica and the heating wire is a nichrome alloy.

Preferably, the linkage assembly has a plurality of levers connected in series such that downward movement of the bottom bracket is amplified to greater downward movement of the bread carriage.

Preferably, the downward movement of the bottom bracket is controllable by varying electrical power supplied to the heating panel.

Preferably, the linkage assembly has a first fulcrum fixed to the body and a first lever with a first lever input arm pivotally connected to the bottom bracket and the first fulcrum, and an output lever arm fixed to the first input lever arm, the first input lever arm being shorter than the first output lever arm, and, a second fulcrum fixed to the body and a second lever input arm pivotally connected to the second fulcrum and a second output arm fixed to the second input arm and connected to the bread carriage, the second input arm being shorter than the second output arm, and the linkage assembly further having:

a linkage arm connecting the first output arm to the second input arm such that movement of the first input arm lifts or lowers the bread carriage.

The linkage assembly may alternatively comprise two linkage sub-assemblies.

The two linkage sub-assemblies are preferably mirrored. The two linkage sub-assemblies are also preferably disposed at opposing ends of the bread carriage.

Each linkage sub-assembly may include:

a first fulcrum fixed to the body and a first lever with a first lever input arm pivotally connected to the bottom bracket and the first fulcrum, and an output lever arm fixed to the first input lever arm, the first input lever arm being shorter than the first output lever arm, and, a second fulcrum fixed to the body and a second lever input arm pivotally connected to the second fulcrum and a second output arm fixed to the second input arm and connected to the bread carriage, the second input arm being shorter than the second output arm, and the linkage sub-assembly further having:

a linkage arm connecting the first output arm to the second input arm such that movement of the first input arm lifts or lowers the bread carriage.

Another aspect of the invention provides a method of operating a toaster with a body and a carriage movable between an elevated position and a lowered position within the body, and a heating panel for toasting a slice of bread on the carriage, the method comprising:

placing a slice of bread on the carriage.

activating the heating panel;

after a pre-set time period, determining whether the carriage is at the lowered position;

if the carriage is determined to be at the lowered position, deactivating the heating panel upon completion of a predetermined toasting cycle; and, if the carriage is not determined to be at the lowered position, deactivating the heating panel without completing the predetermined toasting cycle.

Preferably, the pre-set time period is between 1 second and 4 seconds.

Preferably, the carriage moves from the lowered position during the predetermined toasting cycle.

Preferably, the toaster further comprises bread guards as a barrier between the bread and the heating panel, and the moves from the lowered position during the predetermined toasting cycle to reduce visible grill marks on the slice caused by the bread guards.

Preferably, the heating panel thermally expands when activated and this expansion moves the carriage such that the carriage is moved from the lowered position during the predetermined toasting cycle by varying power to the heating panel.

Preferably, the toaster generates an alert in response to a determination that the carriage is not at the lowered position after the pre-set time period elapses from the activation of the heating panel.

In a third aspect, the invention provides a toaster for toasting bread or other food, the toaster comprising:

a body having an upward facing slot to receive a slice of bread or a food to be toasted;

a carriage mounted in the body beneath the slot to receive a slice of bread, the carriage being movable between an elevated position and a lowered position;

a heating panel mounted to the body in an upright configuration adjacent the carriage for toasting a side of a slice of bread during a toasting cycle;

a lift mechanism for lifting and lowering the carriage;

a bread guard between the carriage and the heating panel to prevent contact between the slice and the bread and the heating panel; and, a processor for operative control of the heating panel and the lift mechanism; wherein, the processor is configured to move the carriage with the lift mechanism during the toasting cycle to reduce visible grill marks in the slice from the bread guard.

Preferably, the lift mechanism is provided by the heating panel and a linkage assembly, the linkage assembly connecting the heating panel to the carriage, and the heating panel has a contracted form when not toasting bread, and an expanded form when toasting bread, the heating panel having a vertical dimension in the contracted form that is less than the vertical dimension in the expanded form, and the linkage assembly is configured to move the carriage from the elevated position to the lowered position when the heating panel moves from the contracted form to the expanded form.

Preferably, the heating panel has an electrical conductor defining a series of generally vertical conductive paths spaced across the heating panel such that resistive heating of the electrical conductor causes thermal expansion to move the heating panel to the expanded form.

Preferably, the processor is configured to move the carriage during the toasting cycle by varying electrical power to the heating panel.

Preferably, the heating panel has a thermal insulation card and the electrical conductor is a heating wire supported on the card in a serpentine configuration such that the generally vertical conductive paths are spaced across one side of the card facing the carriage.

Preferably, the heating panel has a bottom bracket connected to the linkage assembly, and the heating panel is mounted within the body such that the bottom bracket moves downward in response to the thermal extension to the expanded form.

Preferably, the thermal insulation card has an upper portion and a lower portion, the lower portion being configured to move downward relative to the upper portion in response to the thermal expansion.

Preferably, the thermal insulation card is formed from mica and the heating wire is a nichrome alloy.

BRIEF DESCRIPTION OF THE DRAWINGS

Preferred embodiments of the present invention will now be described by way of example only with reference to the accompany drawings in which.

DESCRIPTION OF EMBODIMENTS

Figure 1A:
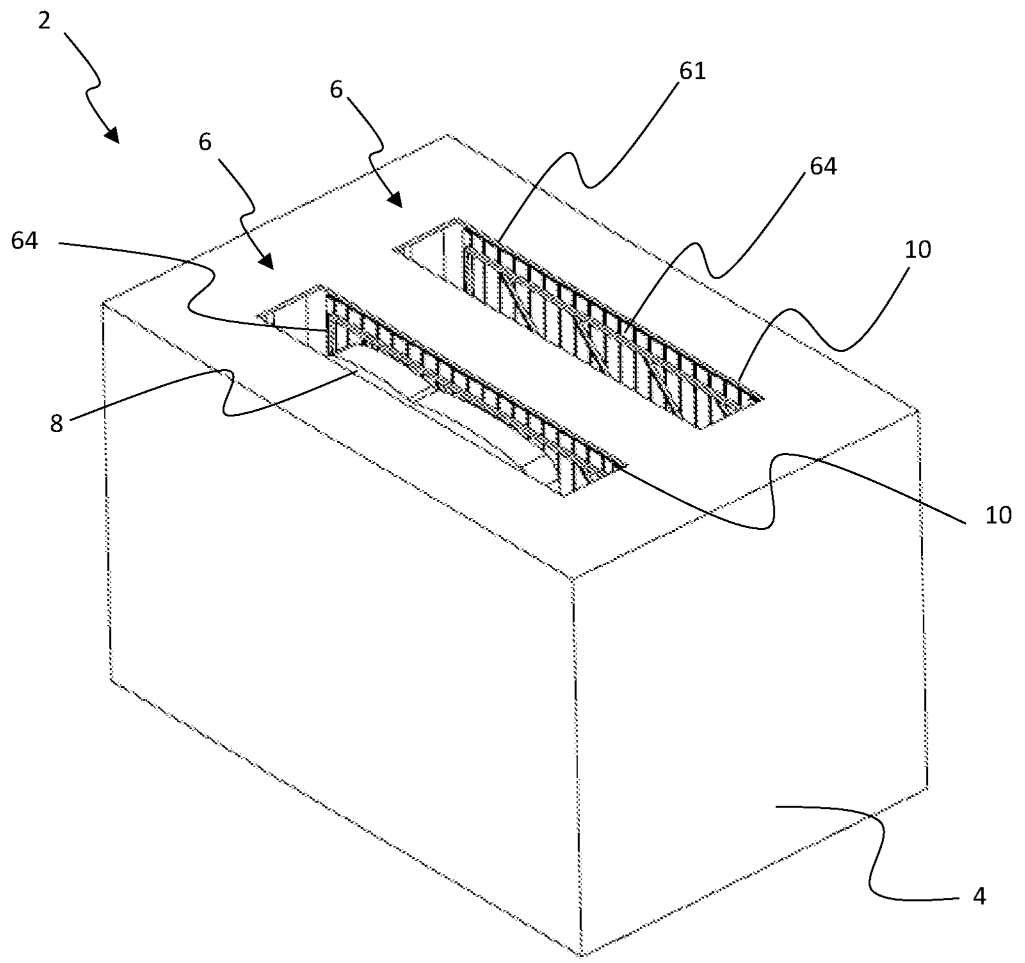
FIG. 1A shows a toaster for toasting slices of bread according to the present invention.

Referring to the Figures, a toaster 2 for toasting slices of bread 8 is depicted and described in detail. However, it will be appreciated the toaster may toast or heat other food products such as pastry, muffins, crumpets and so on. As shown in FIG. 1A, the toaster 2 has a body 4 with a number of upwardly facing slots 6 for receiving slices of bread 8. Beneath each of the slots 6 is a bread carriage 16 (described below) positioned between opposing heated panels 10. A bread guard 64 between the bread slice 8 and the heating side 61 of the panel 10 guards against contact with the elements of the panel 10. It will be appreciated that the number and configuration of the slots 6 is not necessarily limited to what is shown in the drawings and described above, and may be customised to suit the design requirements of the toaster 2.

Figure 1B:
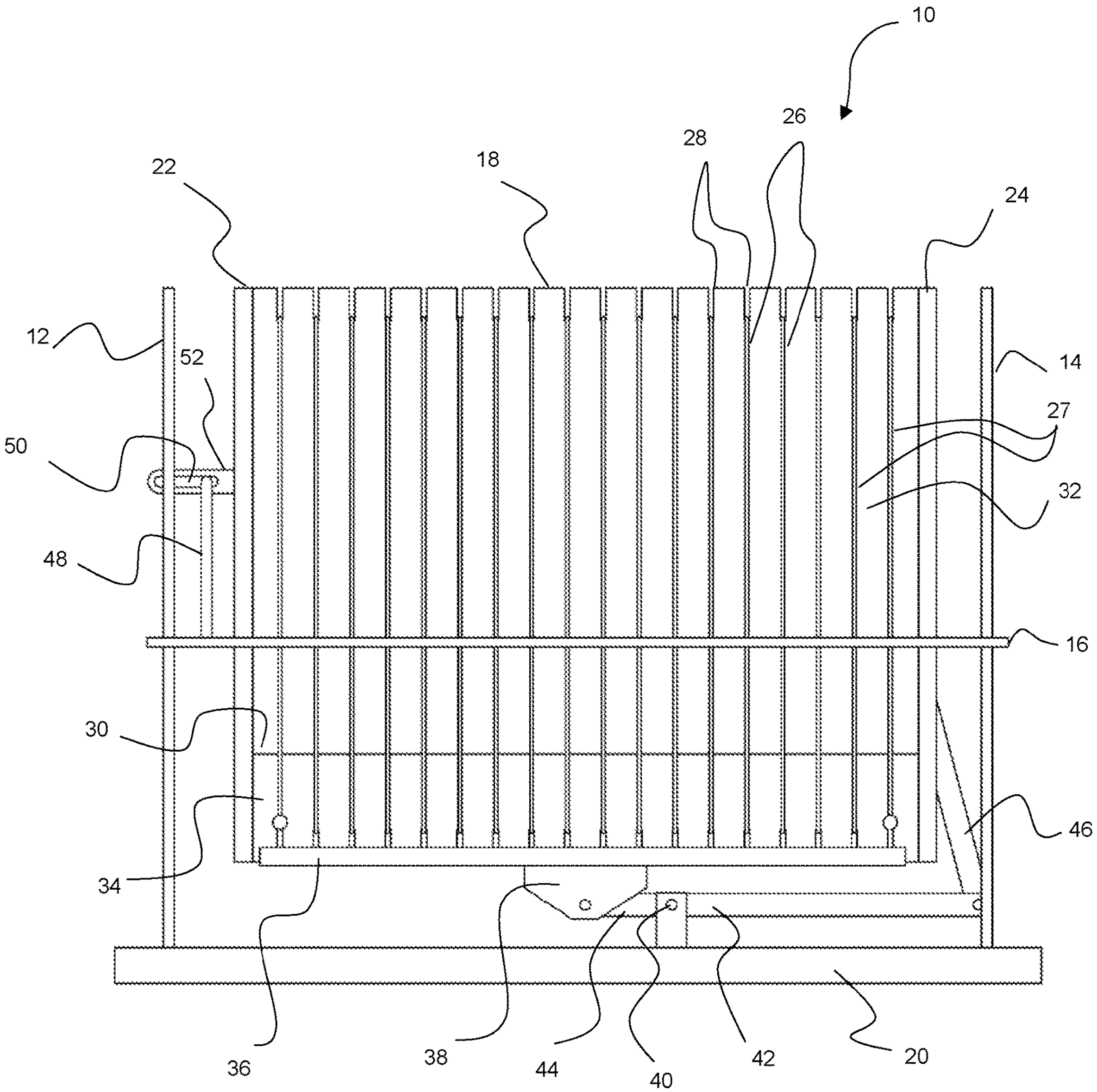
FIG. 1B shows the heating side of a heater panel in its contracted form, and a lift mechanism for a bread carriage within a toaster.
Figure 2:
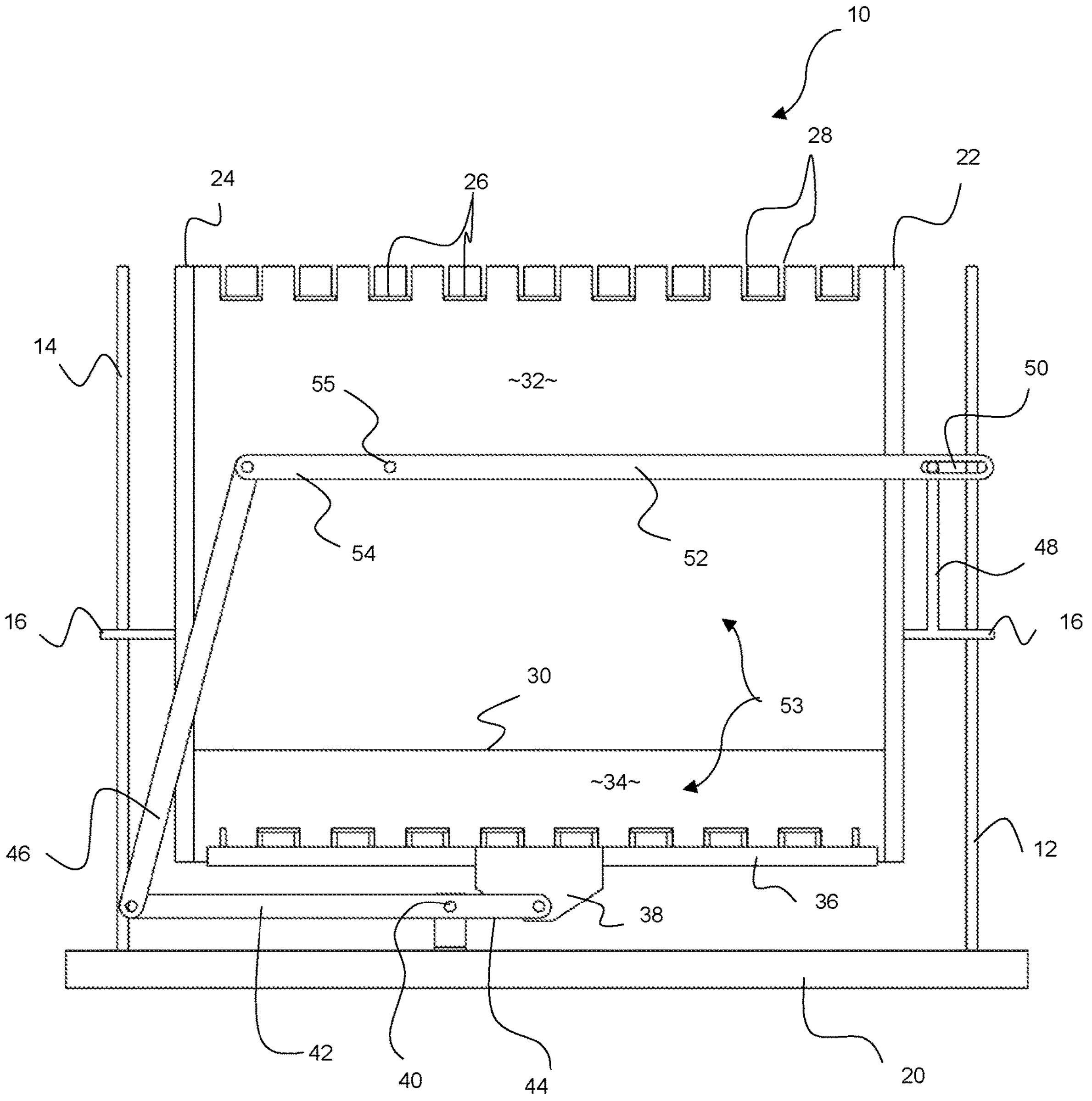
FIG. 2 shows the non-heating side of the heater panel and bread carriage lift mechanism shown in FIG. 1.
Figure 8:
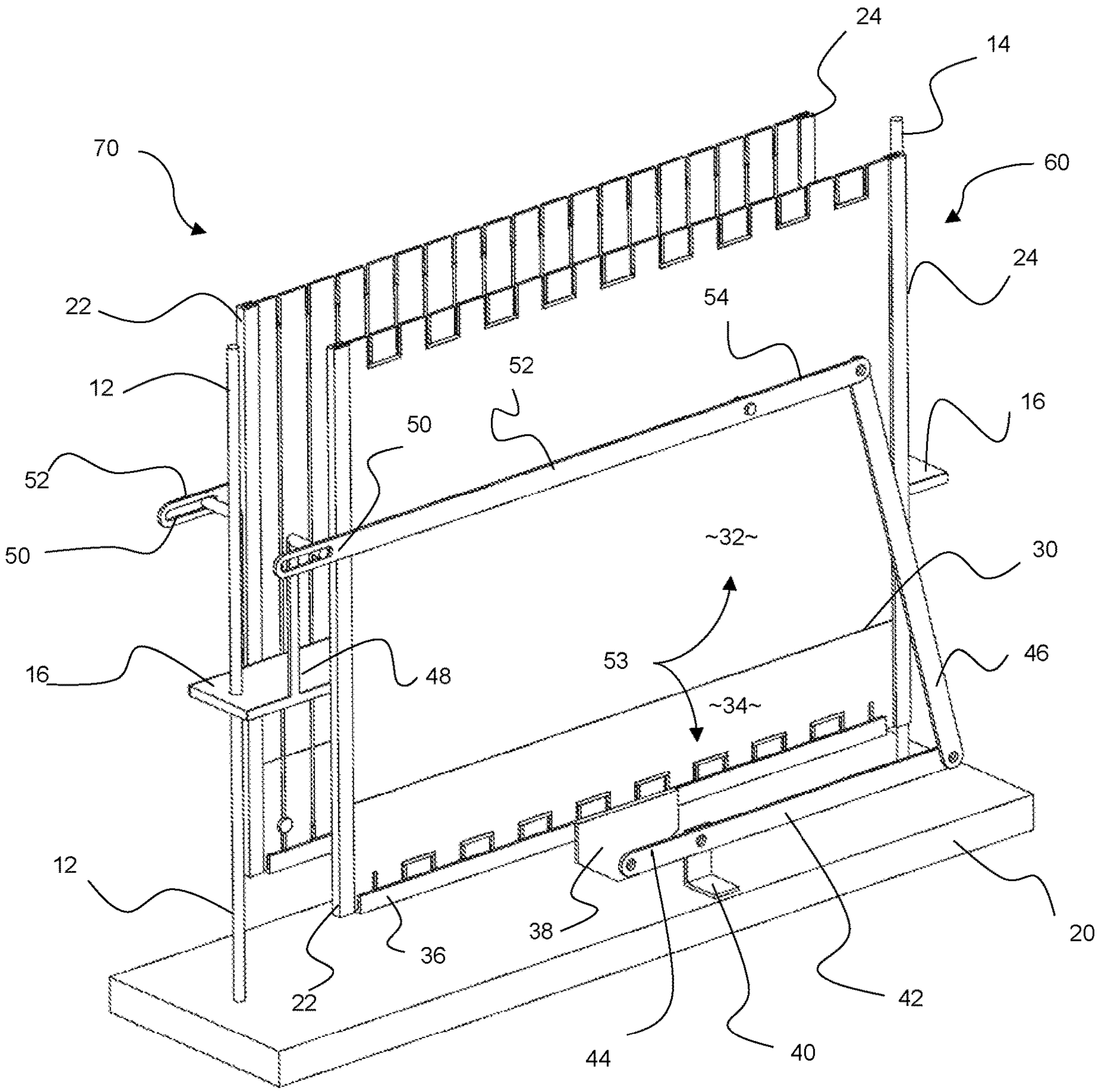
FIG. 8 is a pair of heater panels positioned on both sides of a bread carriage in the elevated position.
Figure 9:
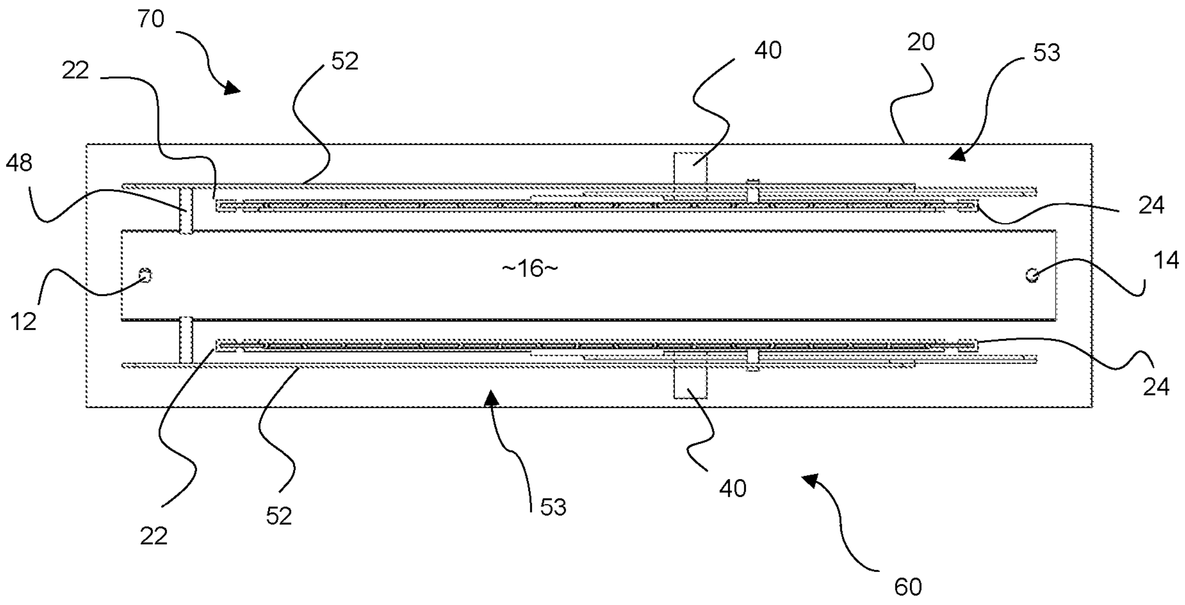
FIG. 9 is a plan view of the pair of heater panels shown in FIG. 8.
Figure 10:
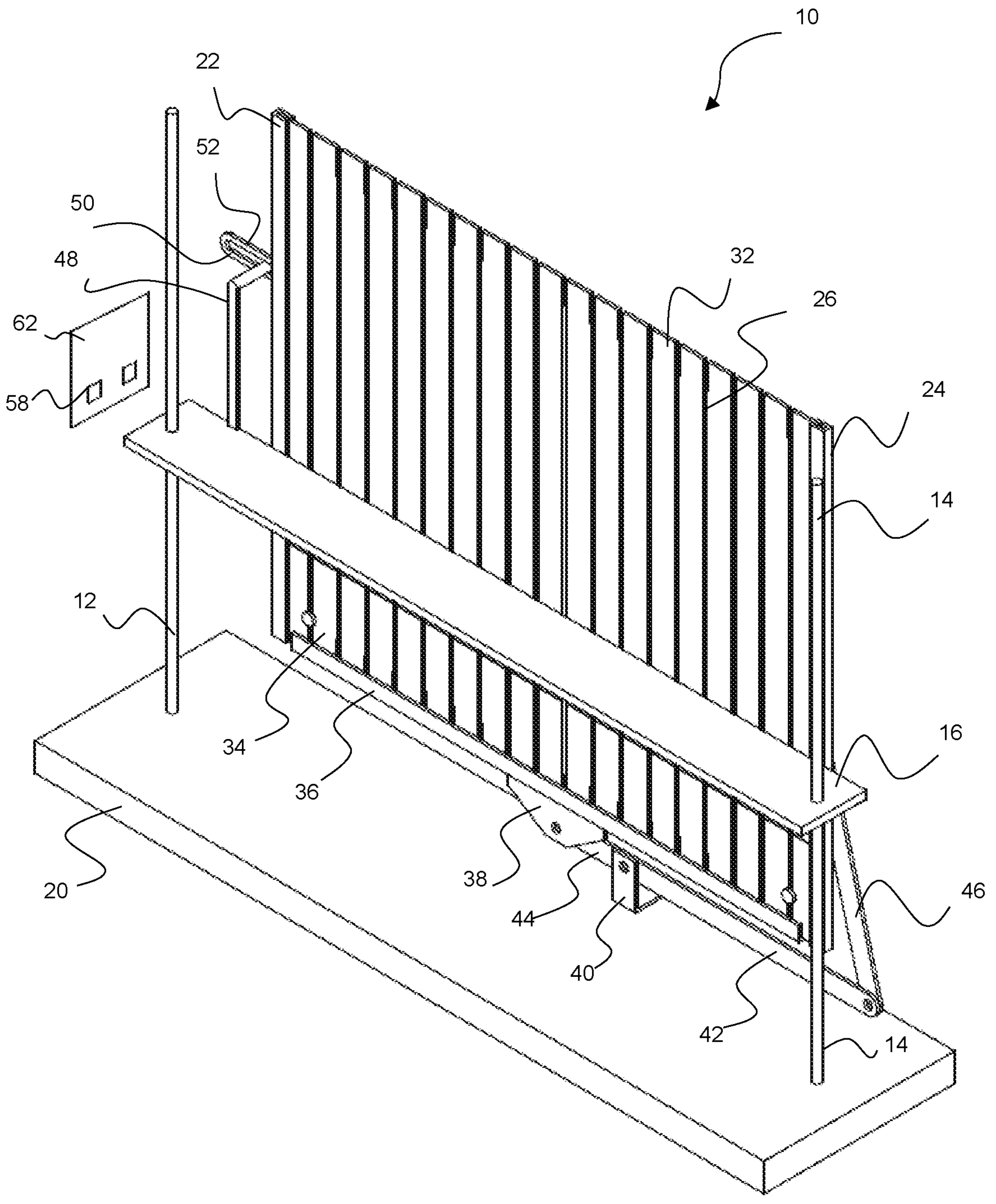
FIG. 10 is a perspective view of the heating side of the heater panel with the bread carriage in an elevated position together with a schematic representation of the sensor for detecting the presence of bread.

FIG. 1B shows the heating side 61 of a heater panel 10 with the bread carriage 16 in an elevated position, and the bread guard 64 removed for clarity. FIG. 2 shows the heater panel 10 of FIG. 1B from the non-heating side with the bread carriage 16 in the elevated position. The bread carriage 16 slides between the elevated position and a lowered position along first guide rail 12 and second guide rail 14. The bread carriage 16 may alternatively slide between the elevated position and the lowered position along only one of the guide rails 12 or 14. Opposing heater panels 10 are positioned on either side of the bread carriage 16 such that the heating sides 61 face each other to simultaneously toast both sides of the slice of bread. In the interest of clarity, FIGS. 1B to 7 show a single heater panel 10, however the pair of inwardly facing heater panels 60 and 70 are shown in FIGS. 8 to 10.

The first and second guide rails 12 and 14 may be fixed to a supporting base 20 provided by the body 4 of the toaster 2. The heater panel 10 may also be fixed to the body 4 such that the first and second side edge channels 22 and 24 are fixedly secured relative to the base 20 and the body 4. The edge channels 22 and 24 hold the side edges of a thermally insulating card 18 which is typically formed from mica which contains aluminosilicate minerals to resist high temperatures and provides a good insulator. This may at least protect the components outside the toasting cavity from excessive temperatures that may cause damage or risk burning the user.

The mica card 18 may be provided in two portions with an upper portion 32 abutting the lower portion 34 along a split line 30 when the bread carriage 16 is in the elevated position. While the upper portion 32 of the mica card 18 is fixed in the side edge channels 22 and 24, the lower portion 34 is free to slide within the side edge channels 22 and 24. A bottom bracket 36 extending along the lower edge of the mica card 18 also moves together with the lower portion 34 relative to the upper portion 32.

The top and bottom edges of the mica card 18 may have a series of spaced edge grooves 28. An electrically conductive heater in the form of resistive heating wire 26 is wound onto the mica card 18 in a serpentine configuration to provide a series of generally vertical conductive paths 27. Activating the heater panel 10 provides current to the heater wire 26 to generate resistive heating. As the heater wire 26 increases in temperature, it expands in accordance with its coefficient of thermal expansion. One example of heater wire with suitable resistive properties as well as sufficient coefficient of thermal expansion, is nichrome metal alloy wire.

Figure 3:
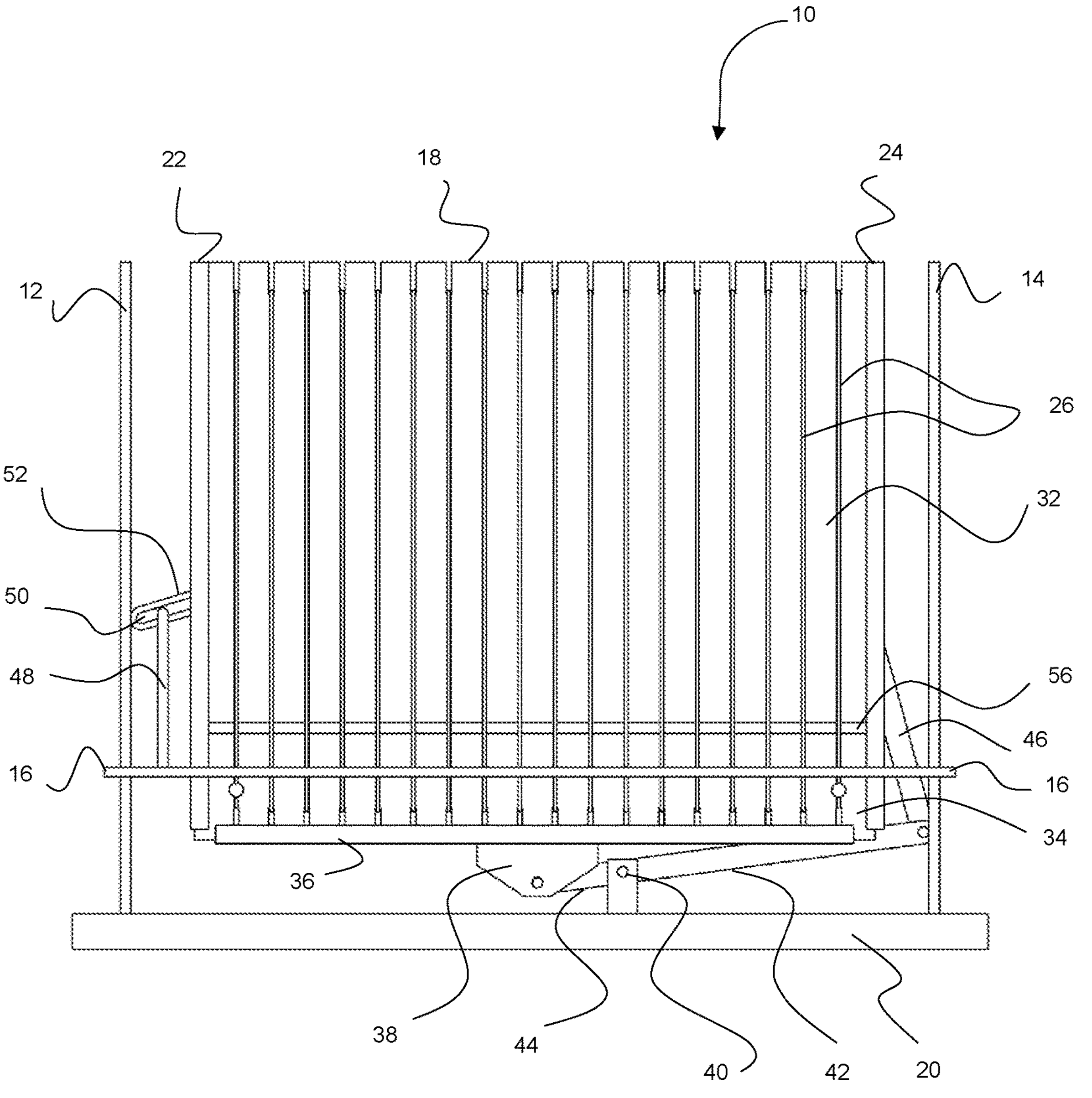
FIG. 3 shows the heating side of the heater panel in its expanded form with the bread carriage in the lowered position.
Figure 4:
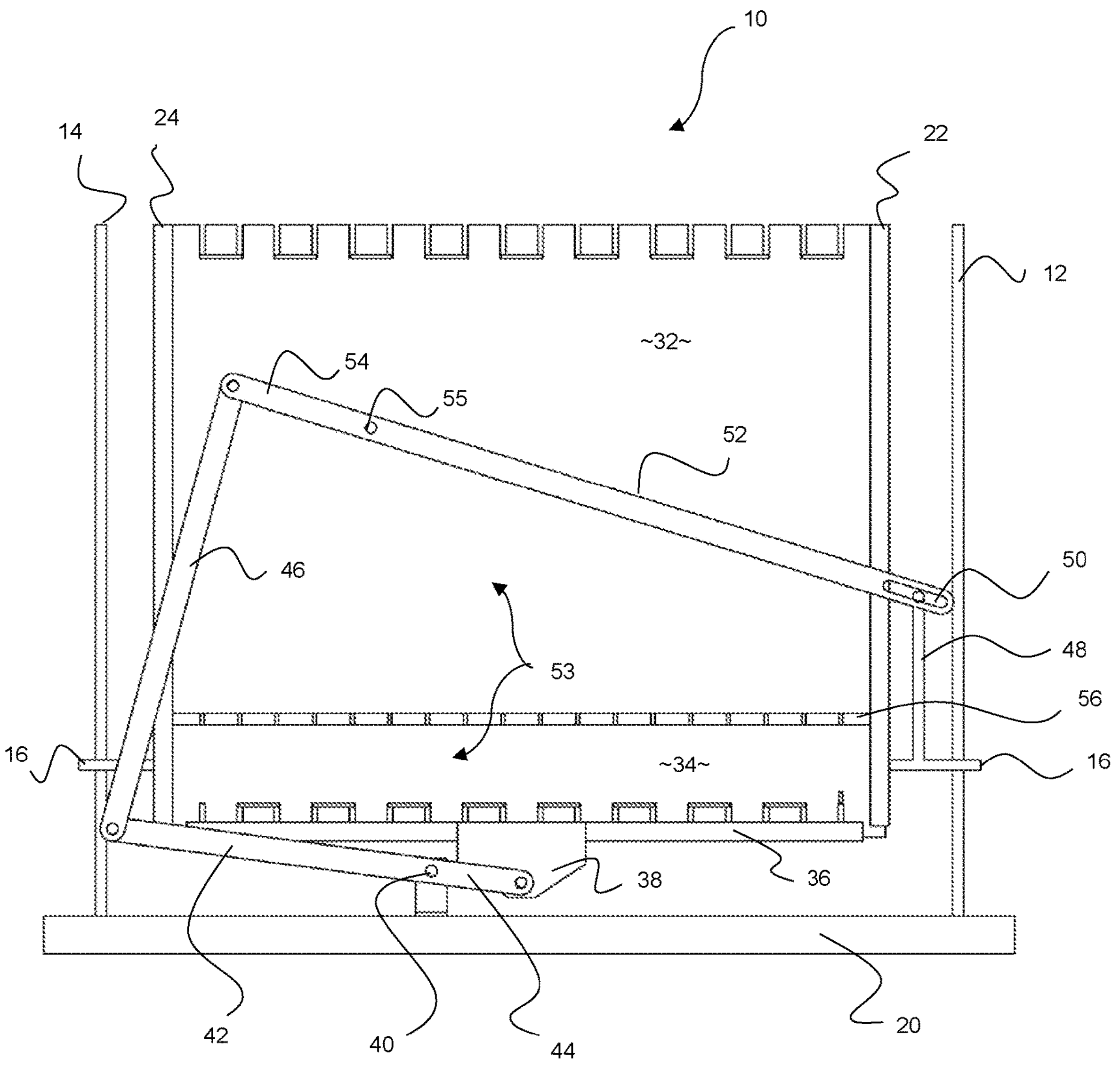
FIG. 4 shows the non-heating side of the heater panel shown in FIG. 2 with the bread carriage in the lowered position.
Figure 5B:
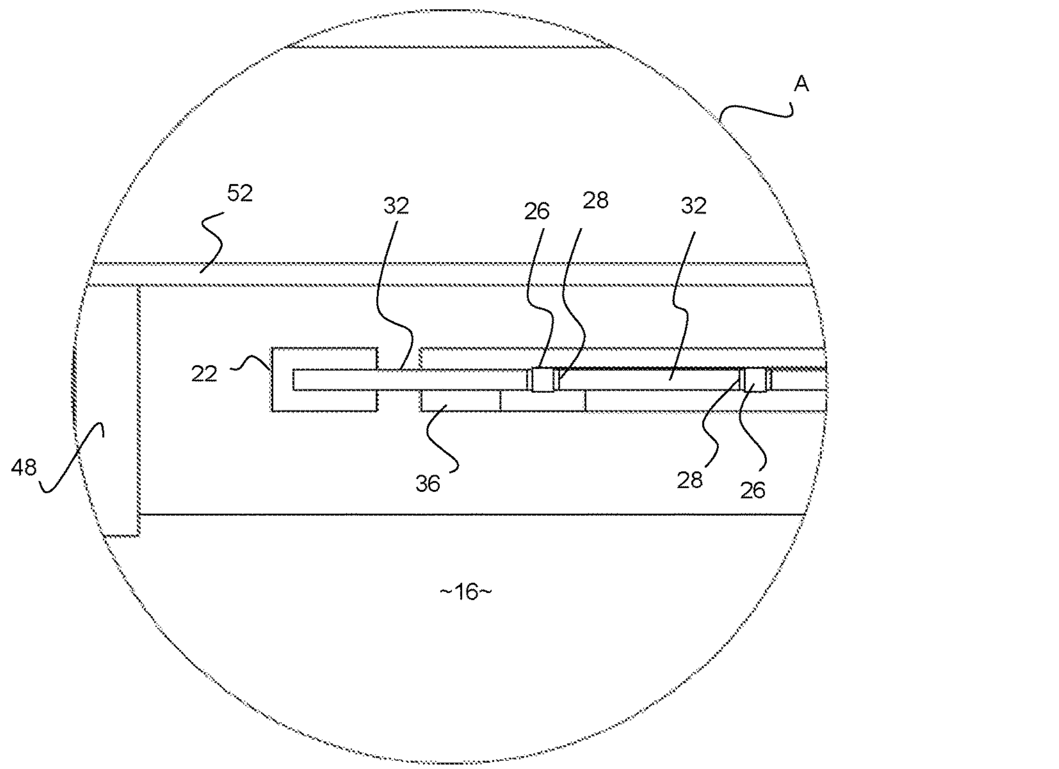
FIG. 5*b* is an enlarged view of inset A shown in FIG. 5*a;*
Figure 5A:
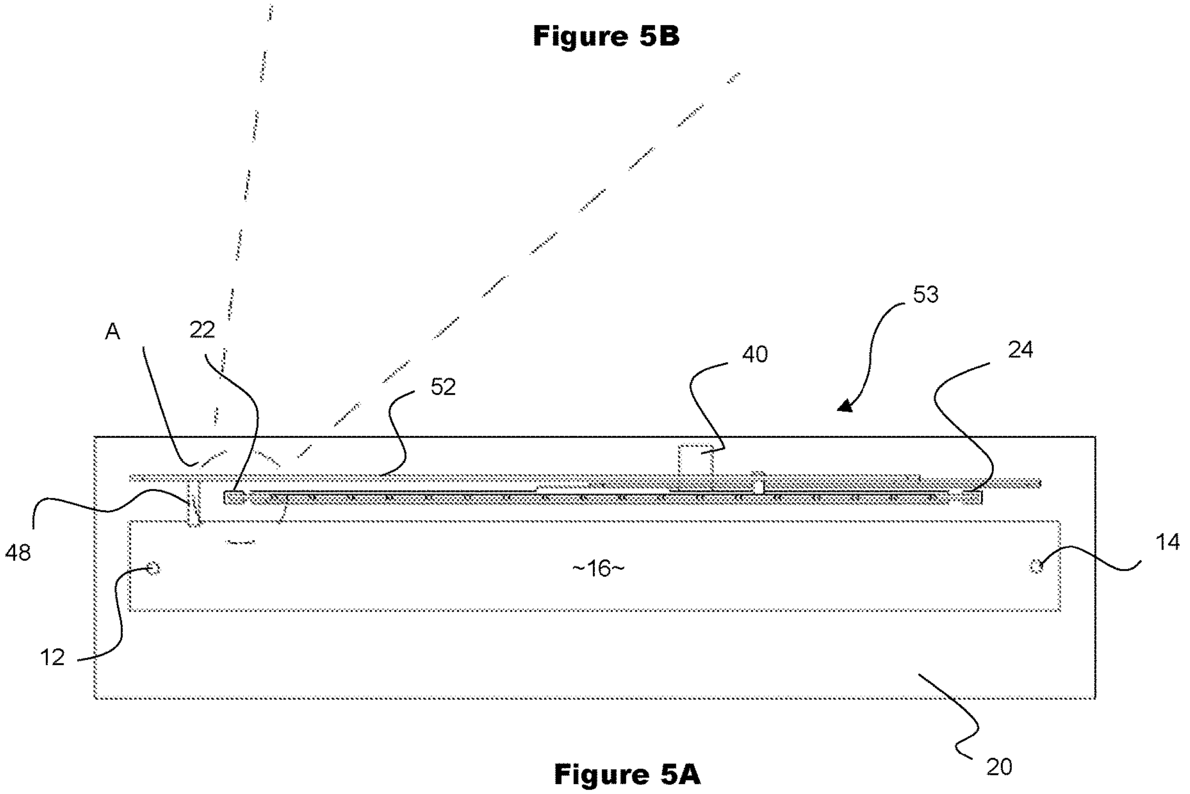
FIG. 5*a* is a plan view of the heater panel shown in FIG. 1.
Figure 6:
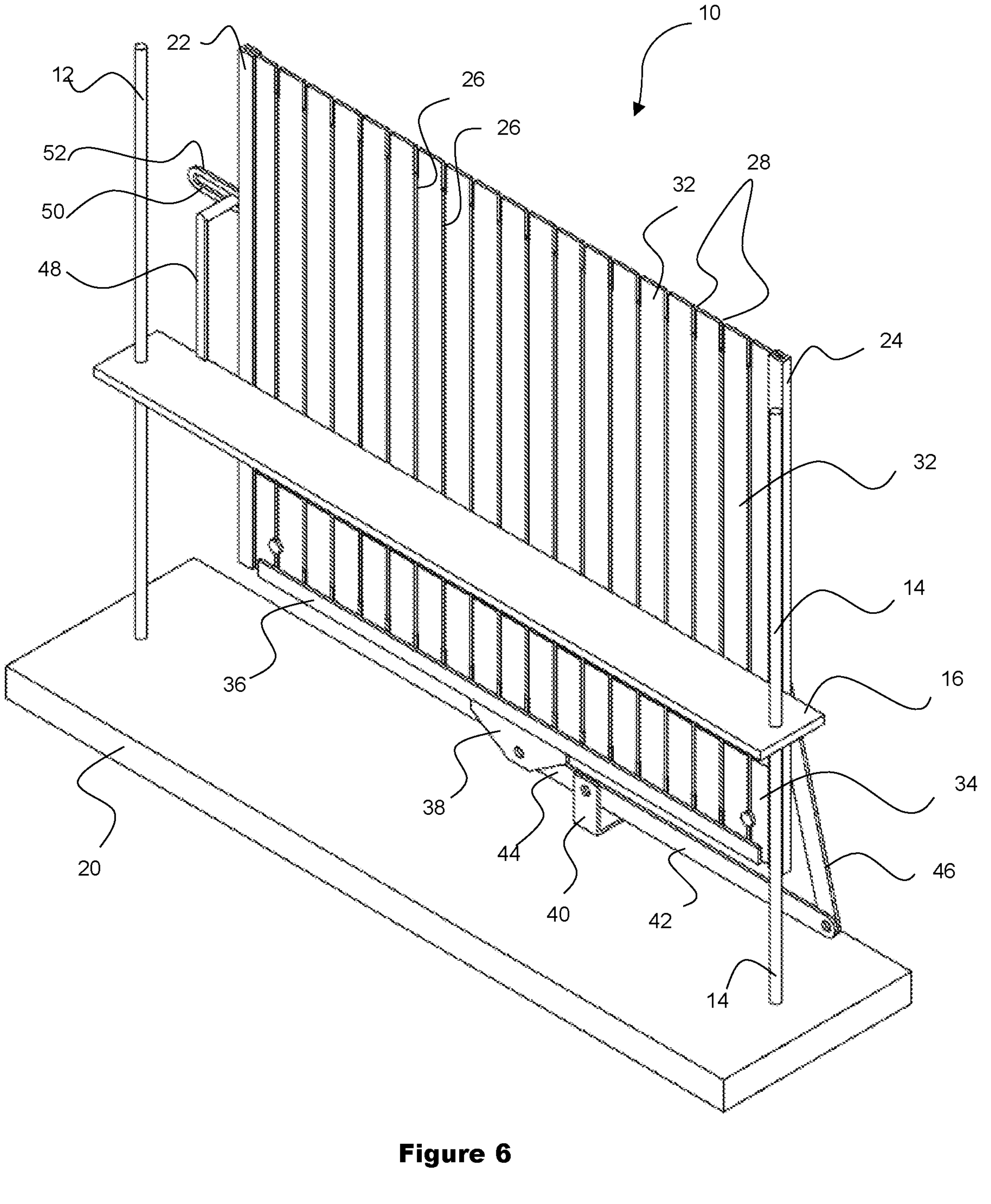
FIG. 6 is a perspective view of the heating side of the heater panel and the bread carriage in the elevated position.
Figure 7:
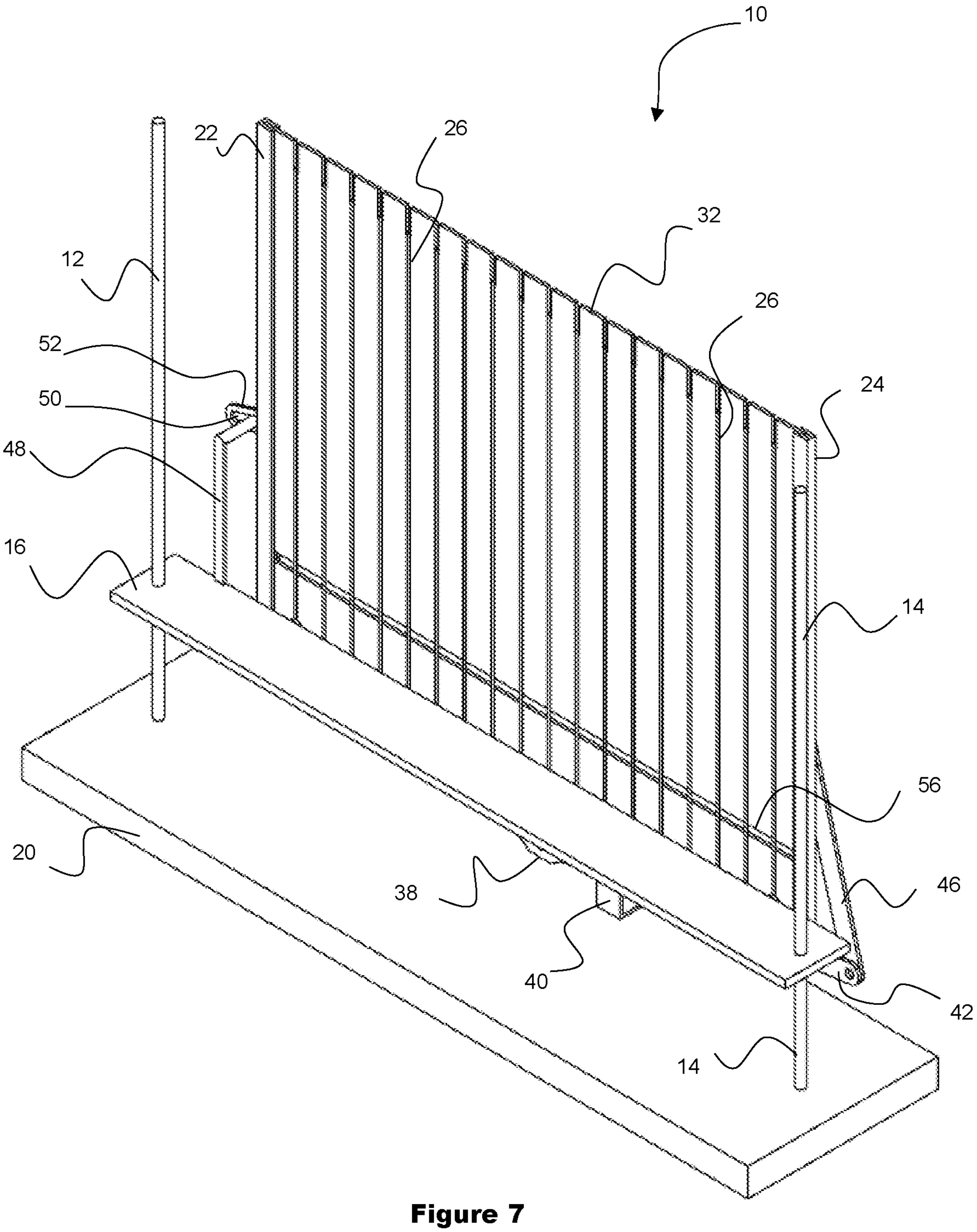
FIG. 7 is a perspective view of the heating side of the heater panel with the bread carriage in the lowered position.
Figure 15:
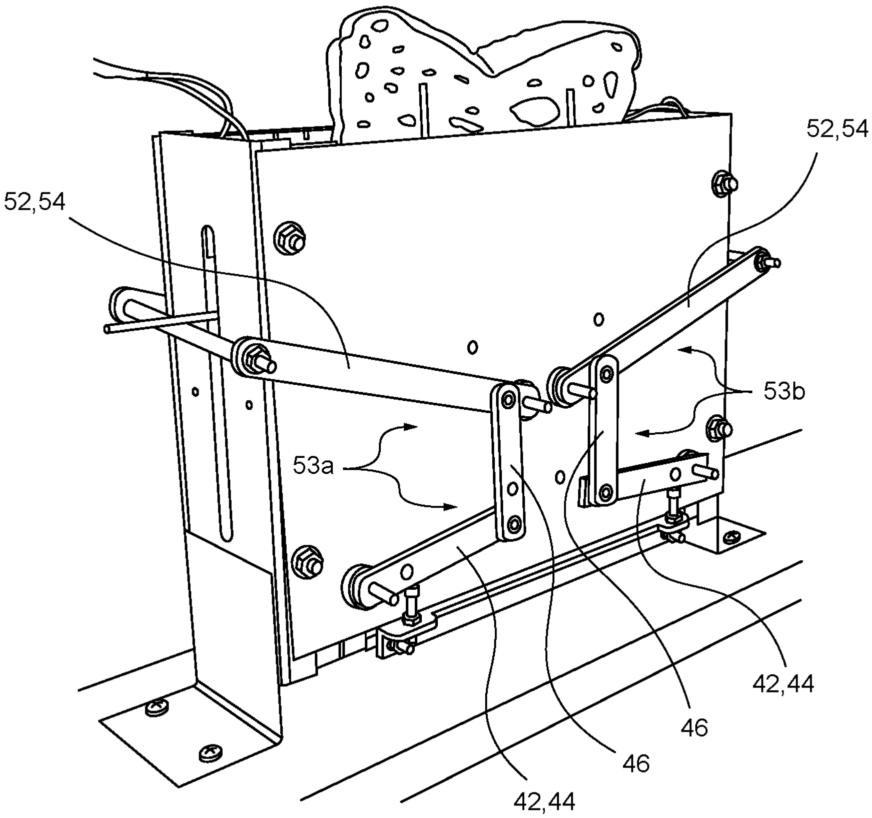
FIG. 15 is a perspective view of a lift mechanism for a bread carriage within a toaster, with the bread carriage in an elevated position.
Figure 16:
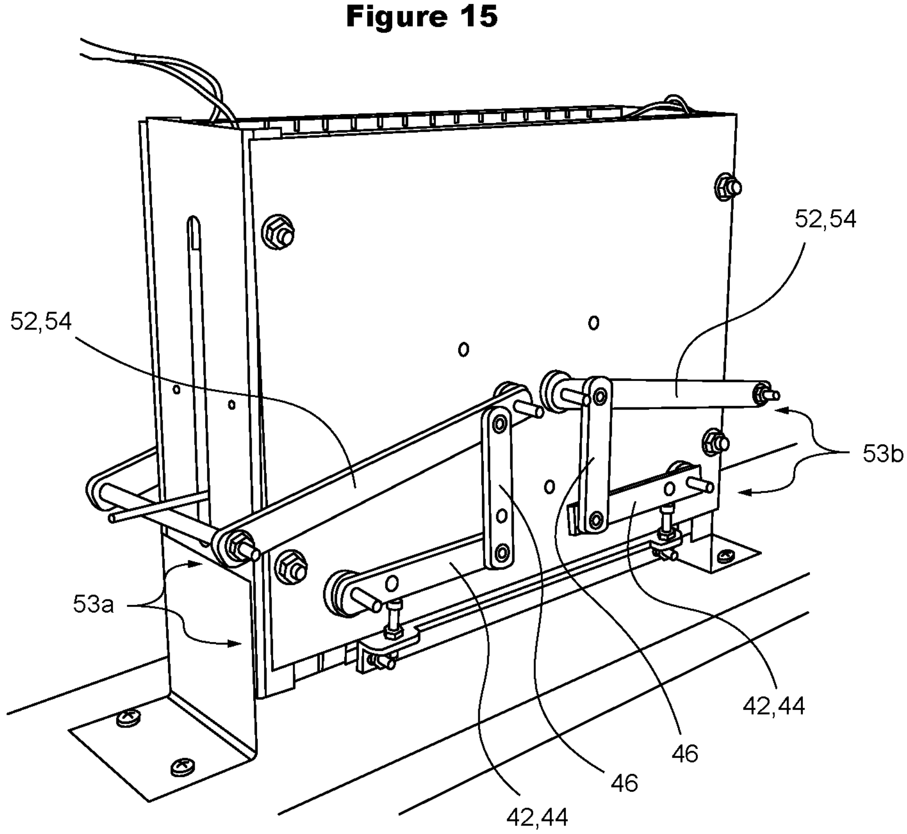
FIG. 16 is a perspective view of the lift mechanism shown in FIG. 15, with the bread carriage in a lowered position.

With the heater wire 26 configured such that it predominantly extends in a vertical direction, the thermal expansion of the heater wire 26 is likewise in the vertical direction. As shown in FIGS. 3 and 4, the lengthening of the conductive heating wire 26 along the conductive paths 27 opens a gap 56 between the upper and lower portions 32 and 34 of the mica card 18. The lower portion 34 slides vertically downwards in the first and second side edge channels 22 and 24. Likewise, the pivot connection 38 fixed to the bottom bracket 36 also moves downwards. The heater panel 10 connects to the bread carriage 16 via a linkage assembly 53. As best shown in FIGS. 2 and 4, the linkage assembly 53 may be provided by two interconnected levers that effectively amplify the vertical displacement of the bottom bracket 36 to the required length of vertical travel between the elevated position and the lowered position of the bread carriage 16. In other embodiments (for example, as shown in FIGS. 15 and 16), the linkage assembly 53 may include a pair of linkage "sub-assemblies" 53*a* and 53*b*, with each sub-assembly 53*a*, 53*b* having two interconnected levers disposed on opposing ends of the bread carriage 16. The two linkage sub-assemblies 53*a* and 53*b* may have a mirrored configuration.

In the first embodiment of the linkage assembly 53 having two interconnected levers (as best shown in FIGS. 2 to 4), the first lever of the linkage assembly 53 is pivotally connected to a first fulcrum 40 fixed to the base 20. The first input arm 44 is hinged to the pivot connection 38 on the bottom bracket 36 and extends to the first fulcrum 40. The first output arm 42 is fixed to the first input arm and extends to a pivot connection on the linkage arm 46.

The linkage arm 46 connects the first lever to the second lever. Specifically, the linkage arm 46 connects the first output arm 42 to the second input arm 54 of the second lever which pivots about a second fulcrum 55. The second input arm 54 extends from a pivot connection to the linkage arm 46 to the second fulcrum 55 while the second output arm 52 extends from the second input arm 54 to the carriage lifter 48 attached to the bread carriage 16. As the distal end of the second output arm 52 moves in an arc, an elongate slot 50 is provided to slidably retain the end of the bread carriage lifter 48.

To facilitate or amplify the vertical movement of the heater panel 10 between its retracted form and expanded form, the linkage assembly 53 is configured such that the first input arm 44 is shorter than the first output arm 42, and the second input arm 54 is shorter than the second output arm 52. As shown in FIGS. 8, 9 and 10, the bread carriage 16 is raised and lowered by a pair of mirror image heater panels 60 and 70, each with their own linkage assemblies 53 acting on separate bread carriage lifter 48. The combined downward force on the respective first input arms 44 as the heater panels 60 and 70 move to the expanded form, easily exceeds the weight of a bread slice on the carriage 16, even though the vertical movement has been amplified by the linkage assemblies 53.

It will be appreciated that the second embodiment of the linkage assembly 53 having the pair of linkage sub-assemblies 53*a* and 53*b* with each sub-assembly 53*a*, 53*b* having two interconnected levers (as best shown in FIGS. 15 and 16) may function in a similar manner as the embodiment of the linkage assembly 53 having two interconnected levers described above. Accordingly, like reference numerals from the have been used to describe like features or parts shown in FIGS. 15 and 16. In this embodiment, the interconnected levers of each sub-assembly 53*a*, 53*b* on either end of the bread carriage 16 have a smaller form factor and the sub-assemblies 53*a*, 53*b* effectively mirror each other to form the pair. Accordingly, the mechanical action of the linkage sub-assemblies 53*a*, 53*b* may be performed equally or simultaneously on both ends of the bread carriage 16 to deliver equal lift.

As shown in FIGS. 15 and 16, the pivot points/connections on the linkage arms 46 remain in generally similar relative locations, with the length of each arm 46 being reduced to accommodate two linkage sub-assemblies 53*a* and 53*b* within the width of the associated toaster components. By way of example, each linkage sub-assembly 53*a*, 53*b* may include a first lever having a first arm or arms 42, 44 (generally in accordance with the first output arm 42 and first input arm 44 described above), a second lever having a second arm or arms s 52, 54 (generally in accordance with the second output arm 52 and second input arm 54 described above), and a linkage arm 46 connecting the first lever to the second lever. Movement of the first arm or arms results in movement of the linkage arm and the second arm or arms, which in turn results in the lifting or lowering of the bread carriage 16.

Similar to the first embodiment of the linkage assembly 53 described above, the second embodiment of the linkage assembly 53 having the pair of linkage sub-assemblies 53*a* and 53*b* may be duplicated such that a mirrored linkage assembly "set" may be provided for each of the opposing heater panels 60, 70. Accordingly, in this arrangement, both sets of mirrored linkage assemblies 53 may operate in parallel/tandem to further facilitate or amplify the movement of the bread carriage 16. It will also be appreciated that the provision of the dual linkage sub-assemblies 53*a* and 53*b* may at least increase the lifting power of the linkage assembly for moving the bread carriage 16, such that heavier loads (e.g. heavier breads) may be lifted, and also lowered.

Figure 11:
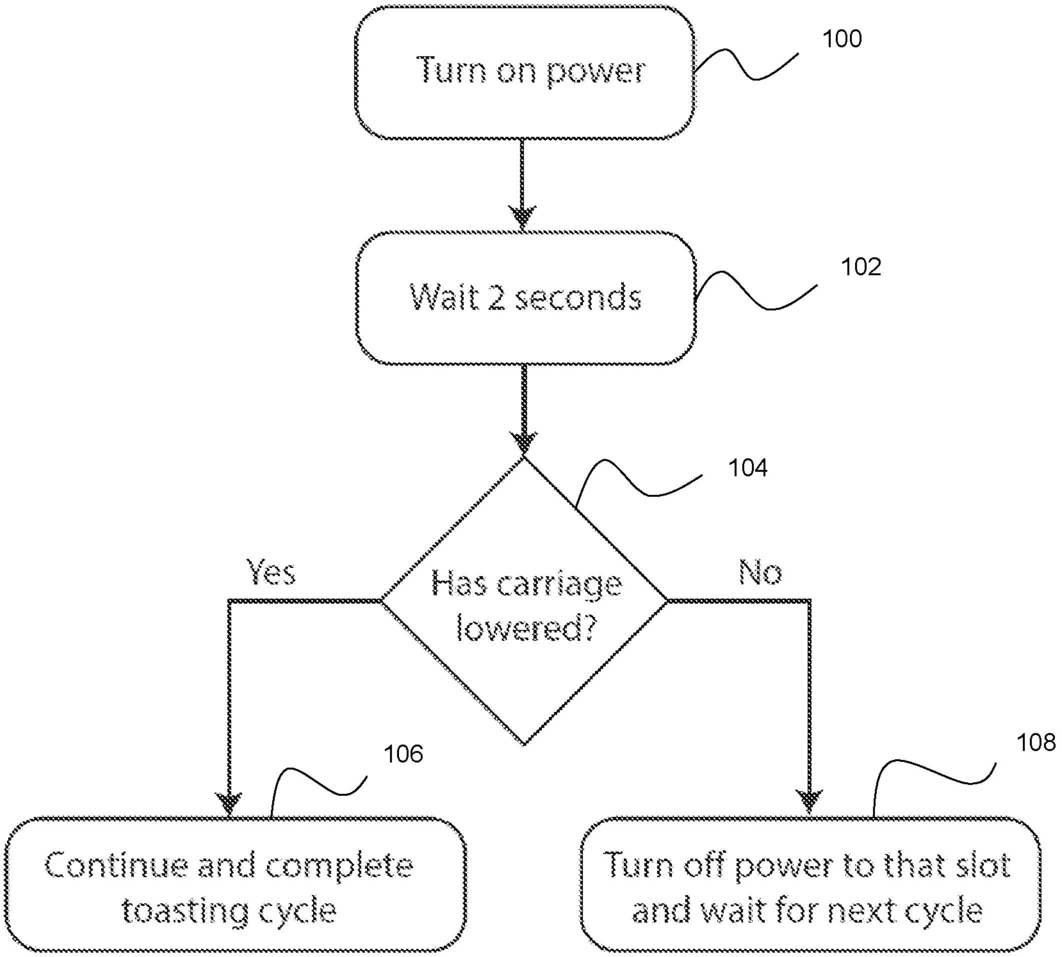
FIG. 11 is a flow chart schematically depicting the operation of the toaster according to the present invention.
Figure 12:
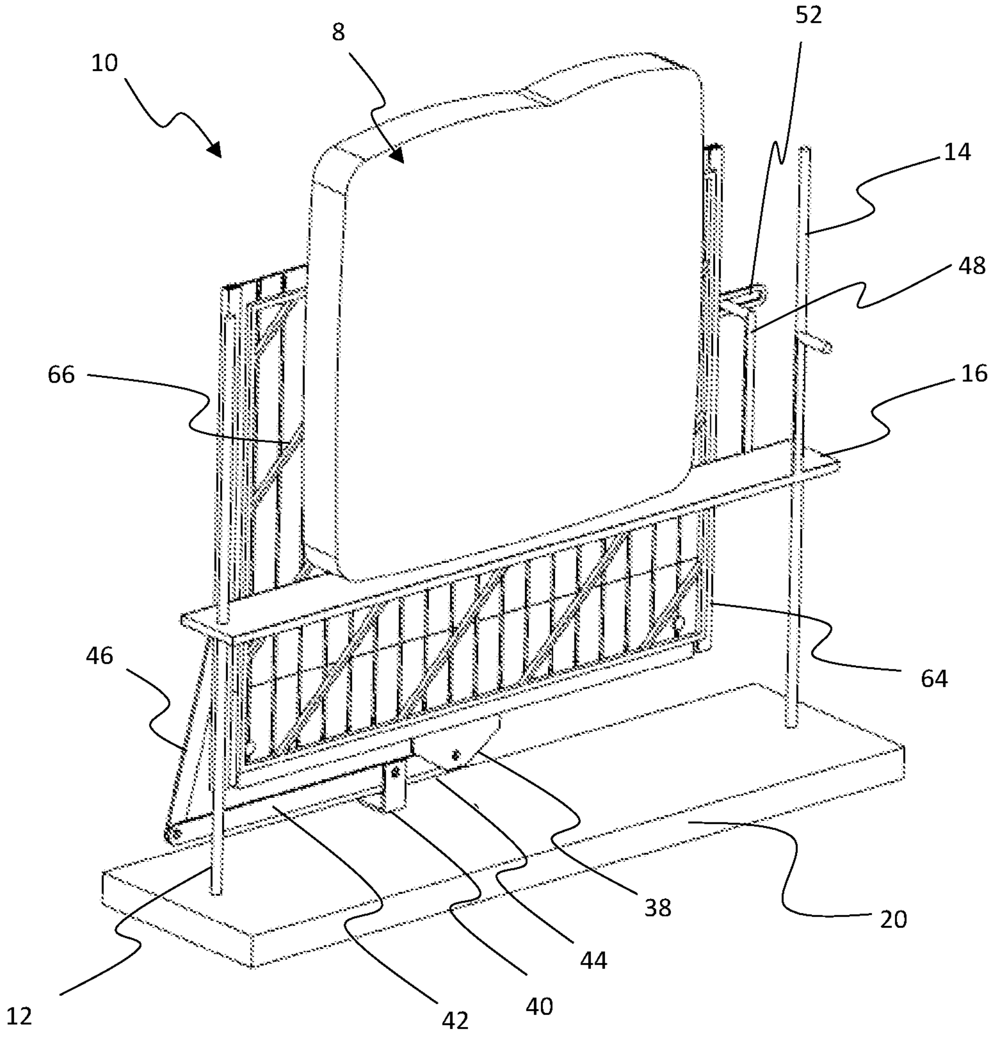
FIG. 12 shows a perspective of the bread carriage holding a slice of bread and a bread guard positioned between the heater panel and the slice of bread.
Figure 13:
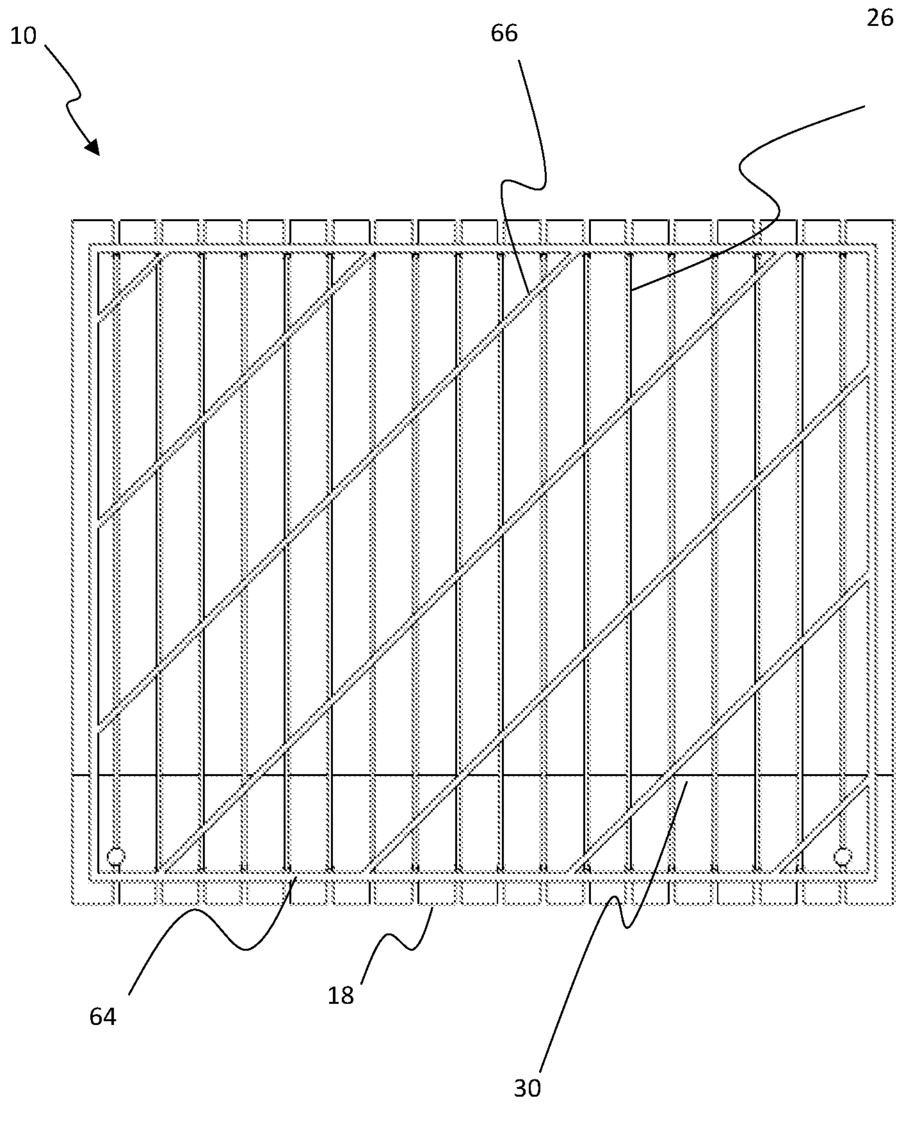
FIG. 13 shows the heater panel of FIG. 13 covered by the bread guard.

As best shown in FIGS. 10 and 11, the toaster 2 incorporates a processor 62 and bread sensor 58. In some embodiments, the bread sensor 58 is in the form of an optical sensor, Hall effect proximity sensor or micro-switch to detect when a slice of bread or other food product is placed on the bread carriage 16. The weight of the bread slice on the carriage 16 provides downward bias on the bottom bracket 36. This helpfully keeps some tension on the vertical paths 27 of the heater wire 26 to prevent bowing and potential short circuits.

Detection of bread on the carriage 16 by the sensor 58 activates the heating panels 60) and 70 (step 100). As the heating wire 26 rapidly heats and expands, the sensor 58 is configured to wait a pre-set time, for example between 1 second and 4 seconds, and preferably approximately two seconds, before checking whether the carriage 16 has lowered (step 102). If the controller 62 determines the bread carriage has lowered (determination 104), the toaster 2 will continue toasting both sides of the bread slice simultaneously until completion of the toasting cycle (step 106). If the processor 62 determines that the bread carriage 16 has not lowered from the sensor 58 feedback, power to the heating panels 60 and 70 associated with the slot 6 is discontinued until the next toasting cycle (step 108) to avoid wasting power. The controller 62 may also provide an alert as a warning or to remind the user that the bread is not within the slot or the bread is not correctly positioned within the slot. This alert may be communicated to the user via a user interface. The user may be able to customise the sensor sensitivity based on a particular type of bread they prefer. For example, bread with a light weight may cause small movement of the bread carriage, which requires high sensor sensitivity.

Figure 14A:
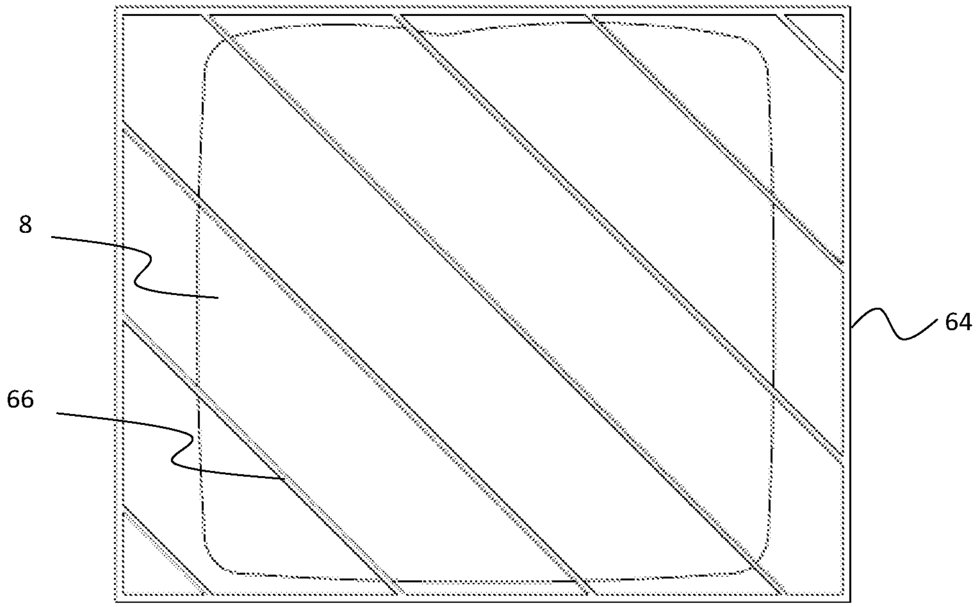
FIG. 14A shows a slice of bread behind a bread guard as it is toasted.

FIGS. 12, 13 14A and 14B show the lift mechanism (provided by the heating panel 10 and the linkage assembly 53) being used to reduce or avoid the appearance of grill marks 68 on a slice of toast 8. Grill marks 68 on the toast result from guard elements 66 in the bread guard 68 masking or 'shading' the bread surface from radiant heat from the heater panel 10. During the toasting cycle, the vertical position of the bread slice 8 within the toaster can be varied by adjusting power to the heater panel 10. FIG. 14A shows the slice 8 in the lowered position. The bread guard 68 between the slice 8 and the heater panel 10 has a series of guard elements 66 as a barrier preventing contact with the heater wires. However, these guard elements 66 mask portions of the bread slice 8 from at least some of the heat radiating from the heater panel 10. The portions make visible grill marks 68 on the surface of the slice 8 and indicate inconsistent toasting.

Figure 14B:
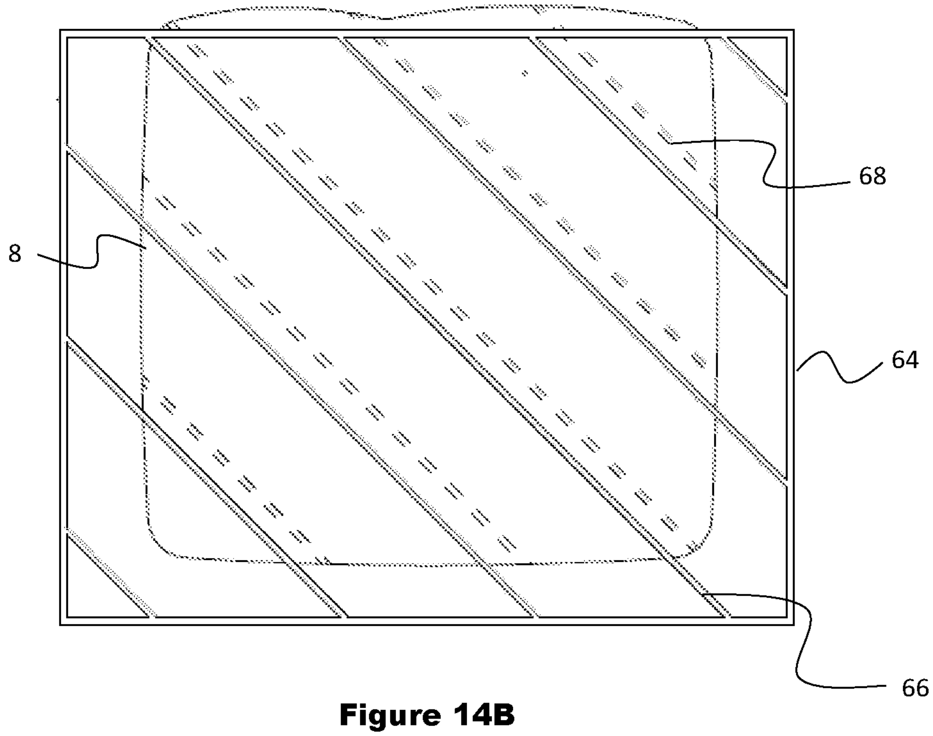
FIG. 14B shows the slice of bread lifted by a small amount relative to the bread guard to reveal the 'grill marks' or inconsistent toasting caused by the bread guard masking the surface of the bread from the heater panel.

FIG. 14B shows the slice lifted away from the lowered position for at least some of the toasting cycle. This exposes the portions of the slice 8 that were previously masked by the heater 10 for more consistent toasting. In turn, the grill marks 68 are reduced or removed from the slice of toast 8. It will be appreciated that the bread slice 8 need only move a small amount relative to the bread guard 64. Moving the slice 8 by the thickness of the guard elements 66 in the direction of travel of the carriage 16 will expose the previously masked portions. It will be appreciated that the travel direction of the bread carriage should not be parallel to the extent of the guard elements 66. For example, if the guard elements 66 of FIGS. 14A and 14B were vertical, the vertical lift of the slice 8 would not reduce the grill marks 68. It will also be understood that the toasting cycle need not start at the lowered position and then lift away to expose the grill marks 68. As long as there is variation of the position of the bread slice 8 relative to the bread guard 64 during the toasting cycle (bearing in mind the orientation of the guard elements 66 discussed above), toasting will be more consistent and the grill marks 68 will be reduced.

Varying the position of the slice 8 during may be achieved by adjusting the power to the heater wire 26, thereby increasing or decreasing the thermal expansion of the wire and hence the bread carriage 16 position. The amount of variation of power to the heaters may depend on the type of the bread and/or the user-selected toasting shade. Optionally, the user may manually input the variation of the position of the slice 8, and the timing of any variations, via the user interface (not shown).

The present invention has been described herein by way of example only. Skilled workers in this field will readily recognise many variations and modifications which do not depart from the spirit and scope of the broad inventive concept.

| Component List | |
|---|---|
| 2 | toaster |
| 4 | body |
| 6 | slots |
| 8 | slice of bread |
| 10 | heater panel |
| 12 | first guide rail |
| 14 | second guide rail |
| 16 | bread carriage |
| 18 | thermally insulating card |
| 20 | supporting base |
| 22 | first side edge channel |
| 24 | second side edge channel |
| 26 | heater wire |
| 27 | conductive paths |
| 28 | spaced edge grooves |
| 30 | split line in the card |
| 32 | upper portion of the card |
| 34 | lower portion of the card |
| 36 | bottom bracket |
| 38 | bottom bracket pivot connection |
| 40 | first fulcrum |
| 42 | first output arm |
| 44 | first input arm |
| 46 | linkage arm |
| 48 | carriage lifter |
| 50 | elongate slot |
| 52 | second output arm |
| 53 | linkage assembly |
| 54 | second input arm |
| 55 | second fulcrum |
| 56 | gap |
| 58 | sensor |
| 60 | heater panel |
| 61 | heating side of heater panel |
| 62 | processor |
| 64 | bread guard |
| 66 | guard elements |
| 68 | grill marks |
| 70 | opposing heater panel |

The invention claimed is:

1. A toaster for toasting bread or other food, the toaster comprising:

a body having an upward facing slot to receive a slice of bread or a food to be toasted;

a carriage mounted in the body beneath the slot to receive a slice of bread, the carriage being movable between an elevated position and a lowered position;

a heating panel mounted to the body in an upright configuration adjacent the carriage for toasting one side of a slice of bread in the carriage;

a linkage assembly for connecting the heating panel to the carriage; wherein, the heating panel has a contracted form when not toasting bread, and an expanded form when toasting bread, the heating panel having a vertical dimension in the contracted form that is less than the vertical dimension in the expanded form, and the linkage assembly is configured to move the carriage from the elevated position to the lowered position when the heating panel moves from the contracted form to the expanded form.

2. The toaster according to claim 1, wherein the heating panel has an electrical conductor defining a series of generally vertical conductive paths spaced across the heating panel such that resistive heating of the electrical conductor causes thermal expansion to move the heating panel to the expanded form.

3. The toaster according to claim 2, wherein the heating panel has a thermal insulation card and the electrical conductor is a heating wire supported on the card in a serpentine configuration such that the generally vertical conductive paths are spaced across one side of the card facing the carriage.

4. The toaster according to claim 3, wherein the heating panel has a bottom bracket connected to the linkage assembly, and the heating panel is mounted within the body such that the bottom bracket moves downward in response to the thermal extension to the expanded form.

5. The toaster according to claim 4, wherein the thermal insulation card has an upper portion and a lower portion, the lower portion being configured to move downward relative to the upper portion in response to the thermal expansion.

6. The toaster according to claim 5, wherein the thermal insulation card is formed from mica and the heating wire is a nichrome alloy.

7. The toaster according to claim 6, wherein the linkage assembly has a plurality of levers connected in series such that downward movement of the bottom bracket is amplified to greater downward movement of the bread carriage.

8. The toaster according to claim 7, wherein during use, the downward movement of the bottom bracket is controllable by varying electrical power supplied to the heating panel.

9. The toaster according to claim 7, wherein the linkage assembly has a first fulcrum fixed to the body and first lever with a first lever input arm pivotally connected to the bottom bracket and the first fulcrum, and an output lever arm fixed to the first input lever arm, the first input lever arm being shorter than the first output lever arm, and, a second fulcrum fixed to the body and a second lever input arm pivotally connected to the second fulcrum and a second output arm fixed to the second input arm and connected to the bread carriage, the second input arm being shorter than the second output arm, and the linkages assembly further having:

a linkage arm connecting the first output arm to the second input arm such that movement of the first input arm lifts or lowers the bread carriage.

10. The toaster according to claim 7, wherein the linkage assembly comprises two linkage sub-assemblies.

11. The toaster according to claim 10, wherein the two linkage sub-assemblies are mirrored.

12. The toaster according to claim 10, wherein the two linkage sub-assemblies are disposed at opposing ends of the bread carriage.

13. The toaster according to claim 10, wherein each linkage sub-assembly includes:

a first fulcrum fixed to the body and a first lever with a first lever input arm pivotally connected to the bottom bracket and the first fulcrum, and an output lever arm fixed to the first input lever arm, the first input lever arm being shorter than the first output lever arm, and, a second fulcrum fixed to the body and a second lever input arm pivotally connected to the second fulcrum and a second output arm fixed to the second input arm and connected to the bread carriage, the second input arm being shorter than the second output arm, and the linkage sub-assembly further having:

a linkage arm connecting the first output arm to the second input arm such that movement of the first input arm lifts or lowers the bread carriage.

14. A method of operating the toaster according to claim 1, the method comprising:

placing a slice of bread on the carriage;

activating the heating panel;

after a pre-set time period, determining whether the carriage is at the lowered position; if the carriage is determined to be at the lowered position, deactivating the heating panel upon completion of a predetermined toasting cycle; and, if the carriage is not determined to be at the lowered position, deactivating the heating panel without completing the predetermined toasting cycle.

15. The method according to claim 14, wherein the pre-set time period is between 1 second and 4 seconds.

16. The method according to claim 14, wherein the carriage moves from the lowered position during the predetermined toasting cycle.

17. The method according to claim 16, wherein the toaster further comprises bread guards as a barrier between the bread and the heating panel, and the moves from the lowered position during the predetermined toasting cycle to reduce visible grill marks on the slice caused by the bread guards.

18. The method according to claim 17, wherein the heating panel thermally expands when activated and this expansion moves the carriage such that the carriage is moved from the lowered position during the predetermined toasting cycle by varying power to the heating panel.

19. The method according to claim 14, wherein the toaster generates an alert in response to a determination that the carriage is not at the lowered position after the pre-set time period elapses from the activation of the heating panel.

* * * * *